United States Patent
Chen et al.

(10) Patent No.: US 10,721,062 B2
(45) Date of Patent: Jul. 21, 2020

(54) UTILIZING ERROR CORRECTION FOR SECURE SECRET SHARING

(71) Applicant: HEWLETT PACKARD ENTERPRISE DEVELOPMENT LP, Houston, TX (US)

(72) Inventors: Liqun Chen, Long Down Avenue (GB); Peter Thomas Camble, Stoke Gifford Bristol Avon (GB); Mark Robert Watkins, Stoke Gifford Bristol Avon (GB); Ieuan James Henry, Stoke Gifford Bristol Avon (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 572 days.

(21) Appl. No.: 15/329,997

(22) PCT Filed: Sep. 24, 2014

(86) PCT No.: PCT/US2014/057151
§ 371 (c)(1),
(2) Date: Jan. 27, 2017

(87) PCT Pub. No.: WO2016/048297
PCT Pub. Date: Mar. 31, 2016

(65) Prior Publication Data
US 2017/0250801 A1     Aug. 31, 2017

(51) Int. Cl.
*H04L 9/08*     (2006.01)
*H04L 9/30*     (2006.01)
*G06F 7/58*     (2006.01)

(52) U.S. Cl.
CPC .......... *H04L 9/085* (2013.01); *H04L 9/0869* (2013.01); *H04L 9/0894* (2013.01); *H04L 9/304* (2013.01); *G06F 7/588* (2013.01); *H04L 2209/08* (2013.01)

(58) Field of Classification Search
CPC ....... H04L 9/085; H04L 9/0869; H04L 9/304; H04L 9/0894; H04L 2209/08; G06F 7/588
See application file for complete search history.

(56) References Cited

U.S. PATENT DOCUMENTS 5,825,880 A * 10/1998 Sudia ...................... G06F 21/40
                                                      713/180
6,411,716 B1 * 6/2002 Brickell .................. G06F 21/40
                                                      380/286

(Continued)

OTHER PUBLICATIONS

Plank et al., "Screaming Fast Galois Field Arithmetic Using Intel SIMD Instructions", Proceedings of the 11th USENIX conference on File and Storage Technologies (FAST '13), 2013, pp. 299-306, <https://www.ssrc.ucsc.edu/Papers/blank-fast13.pdf>.

(Continued)

*Primary Examiner* — Theodore C Parsons
*Assistant Examiner* — Thomas Ho
(74) *Attorney, Agent, or Firm* — Hewlett Packard Enterprise Patent Department

(57) ABSTRACT

Utilizing error correction (ECC) for secure secret sharing includes computing an encrypted key using a key and a number of random values, computing, based on a first ECC scheme, a key ECC for the encrypted key and the random values, and storing a number of key fragments on a number of storage servers, the number of key fragments includes the encrypted key, the random values, and the key ECC.

16 Claims, 5 Drawing Sheets

(56) References Cited

U.S. PATENT DOCUMENTS

| | | | |
|---|---|---|---|
| 7,634,708 B2* | 12/2009 | Kark | G06F 12/1475 |
| | | | 711/164 |
| 8,031,875 B1* | 10/2011 | Juels | G06Q 10/087 |
| | | | 380/277 |
| 8,538,029 B2 | 9/2013 | Li et al. | |
| 9,165,158 B2* | 10/2015 | Li | H04L 9/083 |
| 9,413,735 B1* | 8/2016 | Hird | H04L 63/08 |
| 9,459,955 B2* | 10/2016 | Tuers | G06F 11/1012 |
| 2002/0013898 A1* | 1/2002 | Sudia | G06Q 20/02 |
| | | | 713/155 |
| 2004/0022391 A1* | 2/2004 | O'Brien | H04L 9/0822 |
| | | | 380/281 |
| 2005/0028064 A1* | 2/2005 | Thomas | G06F 21/83 |
| | | | 714/752 |
| 2008/0205637 A1 | 8/2008 | Kurihara et al. | |
| 2009/0177894 A1 | 7/2009 | Orsini et al. | |
| 2010/0054481 A1 | 3/2010 | Jajodia et al. | |
| 2011/0103580 A1 | 5/2011 | Hazay et al. | |
| 2012/0163590 A1* | 6/2012 | Lieber | H04L 9/085 |
| | | | 380/44 |
| 2012/0163592 A1 | 6/2012 | Bellare et al. | |
| 2012/0243687 A1* | 9/2012 | Li | H04L 9/085 |
| | | | 380/277 |
| 2012/0272000 A1 | 10/2012 | Shalvi et al. | |
| 2013/0010966 A1* | 1/2013 | Li | H04L 9/085 |
| | | | 380/278 |
| 2013/0013931 A1 | 1/2013 | O'Hare et al. | |
| 2013/0046993 A1 | 2/2013 | Jueneman et al. | |
| 2013/0117633 A1 | 5/2013 | Matsukawa et al. | |
| 2014/0359291 A1* | 12/2014 | Wilson | G06Q 10/10 |
| | | | 713/168 |
| 2015/0089231 A1* | 3/2015 | Oxford | H04L 9/0869 |
| | | | 713/171 |
| 2016/0212109 A1* | 7/2016 | Hird | H04L 63/062 |
| 2016/0321000 A1* | 11/2016 | Tuers | G06F 11/1012 |
| 2017/0222805 A1* | 8/2017 | Telford | H04L 9/0822 |

OTHER PUBLICATIONS

International Search Report and Written Opinion received for PCT Patent Application No. PCT/US2014/057151, dated Jun. 23, 2015, 13 pages.

Spectra Logic Corporation, "Spectra Encryption User Guide," Dec. 2012.

Spectra Logic Corporation, "Using BlueScale Encryption Key Management Professional Edition," Spectra Encryption User Guide, Ch. 4, Dec. 2012, pp. 58-82.

Jajodia, S. et al., "LH* RE with Cached Encryption Keys: A Scalable Distributed Data Structure with Recoverable Encryption," (Research Paper), Jun. 2008, 8 pps., http://www.lamsade.dauphine.fr/~litwin/LH-re-work-in-progress15.pdf.

Plank, J.S. et al., "A Performance Evaluation and Examination of Open-Source Erasure Coding Libraries for Storage," (Research Paper), Fast, vol. 9, 2009, pp. 253-265.

Kurihara, J. et al., "A New (k, n)-Threshold Secret Sharing Scheme and Its Extension*," (Research Paper), International Conference on Information Security, 2008, 28 pages.

* cited by examiner

UTILIZING ERROR CORRECTION FOR SECURE SECRET SHARING

BACKGROUND

In cryptography, encryption is used to encrypt data such as messages, files, and objects such that only authorized parties can read the encrypted data. The data may be encrypted via various methods and techniques to create the encrypt data. Once the data is encrypted, the encrypt data can be read if decrypted via a key associated with the encrypted data.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
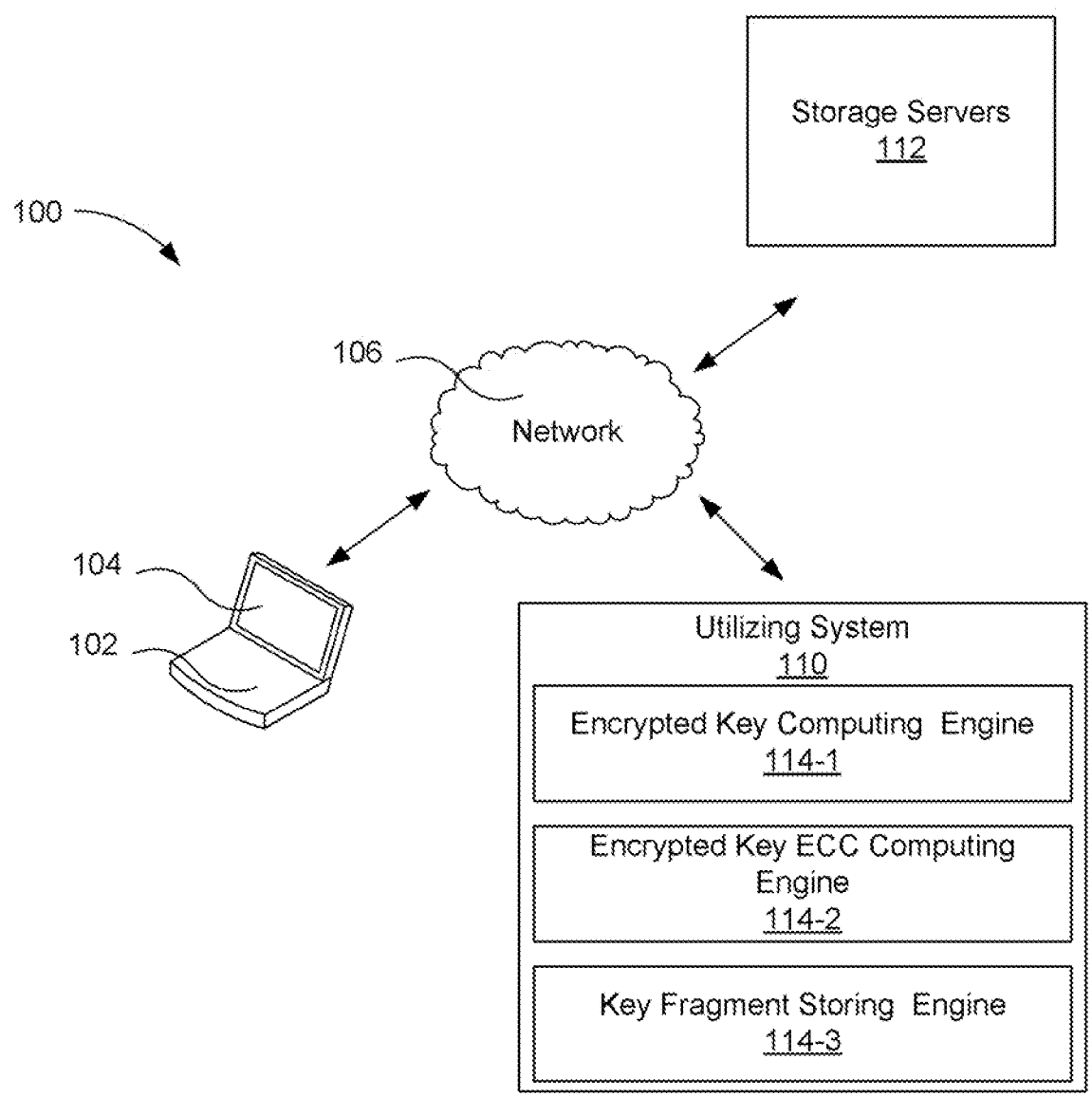
FIG. 1 is a diagram of an example of a system for utilizing error correction (ECC) for secure secret sharing, according to one example of principles described herein.

As mentioned above, in cryptography, encryption is used to encrypt data such as messages, files, and objects such that only authorized parties can read the encrypted data. The data may be encrypted via various methods and techniques to create the encrypt data. Once the data is encrypted, the encrypt data can be read if decrypted via a key associated with the encrypted data.

There are various methods and techniques for encryption. In an example, encryption may be performed via secret sharing. Secret sharing distributes a secret, such as an encrypt data, across a number of storage servers. As a result, each of the storage servers stores a fragment of the encrypt data. The encrypt data can be reconstructed only when a sufficient number of fragments of the encrypt data are combined together. Trivial secret sharing needs access to all the fragments of the encrypt data in order to reconstruct the encrypt data. In an example, secure secret sharing means that anyone having access to with fewer than a sufficient number of fragments of the encrypt data has no extra information about the encrypt data than someone with zero fragments of the encrypt data.

However, using common methods and techniques secret sharing may be slow to generate the number of fragments of the encrypt data. This is especially true when secret sharing uses complex methods. Further, as the size of the encrypt data increases, the longer the secret sharing may take to generate the number of fragments of the encrypt data. This results in delays when encrypting data.

The principles described herein include a method for utilizing error correction (ECC) for secure secret sharing. Such a method includes computing an encrypted key using a key and a number of random values, computing, based on a first ECC scheme, a key ECC for the encrypted key and the random values, and storing a number of key fragments on a number of storage servers, the number of key fragments includes the encrypted key, the random values, and the key ECC. In particular, the key fragments are distributed across the storage servers in such a way that the encrypted key can only be decrypted by accessing a threshold number of storage servers which may be smaller than the number of total storage servers. As a result, the method may store the number of key fragments and decrypt the number of key fragments in a timely manner to reduce delays. As will be described in other parts of this specification, object fragments may also be stored on storage servers.

In the present specification and in the appended claims, the term "object" is meant to be understood broadly as data that is stored in a storage architecture that manages objects. In an example, the object may include data, metadata, and a globally unique identifier. As will be described below, the object may be encrypted via a utilizing system. Once the object is encrypted, the object is referred to as an encrypted object.

In the present specification and in the appended claims, the term "key" is meant to be understood broadly as a piece of information, such as a parameter, that is used to decrypt an encrypted object. In an example, a key may be associated with a length. For example, a length of the key may be 128 bits, 192 bits, 156 bits, or other bits lengths. As will be described below, the key may be encrypted via a utilizing system. Once the key is encrypted, the key is referred to as an encrypted key.

In the present specification and in the appended claims, the term "ECC scheme" is meant to be understood broadly as a mechanism used to store data redundantly with space efficiency on one or more storage servers. In an example, the ECC scheme may be associated with a length. For example, the length of the ECC scheme may be based on a number of storage servers the data is stored on and the number of storage servers needed to reconstruct the data. In an example, the ECC scheme may be associated with an object and a key. In this example, the ECC scheme may be a second ECC scheme and may produce an object ECC. In an example, the ECC scheme may be associated with a key. In this example, the ECC scheme may be a first ECC scheme and may produce a key ECC. In an example, the first ECC scheme and the second ECC scheme may be the same ECC scheme. In another example, the first ECC scheme and the second ECC scheme may be different ECC schemes.

In the present specification and in the appended claims, the term "key fragments" is meant to be understood broadly as parts of data associated with an encrypted key, random values, and ECC for the encrypted key and the random values, or combinations thereof. In an example, the key fragments may be stored on a number of storage servers.

In the present specification and in the appended claims, the term "object fragments" is meant to be understood broadly as parts of data associated with an encrypted object, an object ECC, or combinations thereof. In an example, the object fragments may be stored on a number of storage servers.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for utilizing ECC for secure secret sharing, according to one example of principles described herein. As will be described below and in other parts of this specification, a utilizing system is in communication with a network to compute an encrypted object with a key. Further, the utilizing system computes an encrypted key with random values. Further, the utilizing system computes ECC for the encrypted object, the encrypted key, and the random values. Further, the utilizing system splits an object, the encrypted key, random values, and their ECC into a number of fragments. Further, the utilizing system stores a number of fragments on a number of storage servers. In an example, the number of fragments may include key fragments and object fragments.

As illustrated in FIG. 1, the system (100) includes a user device (102) with a display (104). In this example, a user uses the user device (102) to access a network (106). Further, the user device (102) may be utilized to send an object to a utilizing system (110) for encryption purposes. In another example, the user device (102) may be utilized to receive an object from a utilizing system (110) that has been decrypted. In this example, the display (104) may be used to display the object to the user.

The system (100) further includes the utilizing system (110). In keeping with the given example, the utilizing system (110) computes an encrypted key using a key and a number of random values. In an example, the random values may be generated by a high entropy random number generator. Further, the random values may be the same length as the key. In an example, an encrypted key computing engine (114-1) may be used to compute the encrypted key using the key and the number of random values.

Further, the utilizing system (110) computes, based on a first ECC scheme, an encrypted key ECC for the encrypted key and the random values. As will be described below, the first ECC scheme may allow the encrypted key and the random values to be reconstructed from a threshold number of storage servers (112). In an example, an encrypted key ECC computing engine (114-2) may be used to compute, based on the first ECC scheme, the encrypted key ECC for the encrypted key and the random values.

The utilizing system (110) further stores a number of key fragments on the number of storage servers (112). In an example, the number of key fragments includes the encrypted key, the random values, and the encrypted key ECC for the encrypted key and the random values. In an example, a key fragment storing engine (114-3) may be used to store the number of key fragments on the number of storage servers (112). As a result, the key fragments are distributed across the storage servers in such a way that the encrypted key can only be reconstructed and decrypted by accessing a threshold number of the storage servers (112) which may be smaller than the number of total storage servers (112). More information about the utilizing system (110) will be described later on in this specification.

While this example has been described with reference to storing a number of key fragments on the number of storage servers, a number of object fragments may be stored on the number of storage servers. For example, the utilizing system may compute an encrypted object with a key, compute, based on a second ECC scheme, an object ECC for the encrypted object, and storing a number of object fragments on the number of storage servers, the number of object fragments includes the encrypted object and the object ECC. While this example has been described with reference to encrypting data such as an object, the utilizing system may encrypt other types of data. For example, the utilizing system may encrypt messages and/or files. More information about storing a number of object fragments may be stored on the number of storage servers will be described in other parts of this specification.

While this example has been described with reference to the utilizing system being located over the network, the utilizing system may be located in any appropriate location according to the principles described herein. For example, the utilizing system may be located in a user device, a storage server, a datacenter, other locations, or combinations thereof.

Figure 2:
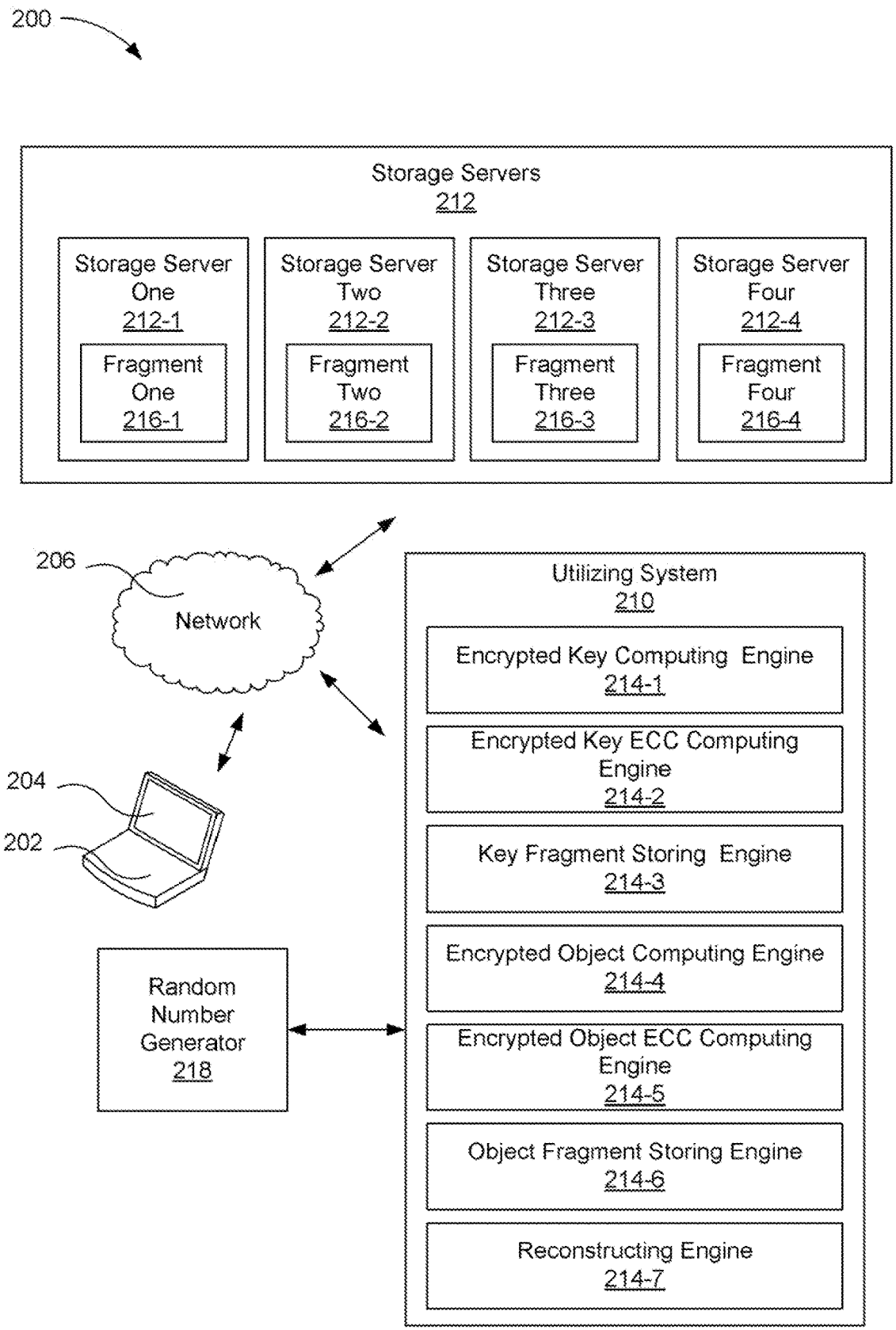
FIG. 2 is a diagram of an example of a system for utilizing ECC for secure secret sharing, according to one example of principles described herein.

FIG. 2 is a diagram of an example of a system for utilizing ECC for secure secret sharing, according to one example of principles described herein. As mentioned above, a utilizing system is in communication with a network to compute an encrypted object with a key. Further, the utilizing system computes an encrypted key with random values. Further, the utilizing system computes ECC for the encrypted object, the encrypted key, and the random values. Further, the utilizing system splits an object, the encrypted key, random values, and their ECC into a number of fragments. Further, the utilizing system stores a number of fragments on a number of storage servers. In an example, the number of fragments may include key fragments and object fragments.

As illustrated in FIG. 2, the system (200) includes a user device (202) with a display (204). As mentioned above, a user uses the user device (202) to access a network (206). Further, the user device (202) may be utilized to send an object to a utilizing system (210) for encryption purposes. In another example, the user device (202) may be utilized to receive an object from a utilizing system (210) that has been decrypted. In this example, the display (204) may be used to display the object to the user.

As mentioned above, the system (200) includes a utilizing system (210). In an example, the utilizing system (210) includes an encrypted key computing engine (214-1), an encrypted key ECC computing engine (214-2), a key fragment storing engine (214-3), an encrypted object computing engine (214-4), an encrypted object ECC computing engine (214-5), an object fragment storing engine (214-6), and a reconstructing engine (214-7). The engines (214) refer to a combination of hardware and program instructions to perform a designated function. Each of the engines (214) may include a processor and memory. The program instructions are stored in the memory and cause the processor to execute the designated function of the engine.

The encrypted key computing engine (214-1) computes an encrypted key using a key and a number of random values. In an example, the length of the key and the length of the random values are the same length. In an example, the encrypted key computing engine (214-1) selects the number of random values using a high entropy random number generator, the number of random values being the same length as the key. For example, the encrypted key computing engine (214-1) selects a number of random values using a random number generator (218). As mentioned above, the random number generator (218) may be a high entropy random number generator. In an example, the number of random values may be the same length as the key. For example, if the key is 128 bits, all of the random values are 128 bits. In an example, the key may be represented as S. Further, the random values may be represented as R1 . . . Rk. In an example, k may be greater or equal to one, but less than the number of storage servers (212). For example, if the system (200) includes four storage servers, the value of k may be one, two, or three. Further, if less than k storage servers are accessed, the key is unrecoverable. This guards against the encrypted object being decrypted if fewer than k storage servers are compromised. In this example, the value of k may be the same as the threshold number of storage servers from which the first ECC scheme can reconstruct the encrypted key and random values, and the second ECC scheme can reconstruct the encrypted object.

Further, the encrypted key computing engine (214-1) computes, based on the random values and the key, an XOR cipher to create the encrypted key. For example, the encrypted key may be defined by Equation 1:

$$S'=S \text{ xor } R1 \ldots \text{ xor } Rk \quad \text{(Equation 1)}$$

In this example, the encrypted key may be S', the key may be represented as S, and the random values may be represented as R1 . . . Rk.

The encrypted key ECC computing engine (214-2) calculates the encrypted key ECC for the encrypted key and the random values, the encrypted key ECC enabling the encrypted key and random values to be reconstructed from a threshold number of the storage servers (212). For example, the encrypted key ECC may be calculated via common methods and techniques as will be mentioned for the object ECC. In an example, the encrypted key ECC is concatenated to the encrypted key as represented in Equation 2:

$$ES'=S\|ECC \quad \text{(Equation 2)}$$

In this example, the encrypted key may be S' and ECC may be the encrypted key ECC. In an example, $\|$ is a concatenation operation. Further, the encrypted key ECC computing engine (214-2) repeats this step for each random value. This creates a number of key fragments that are to be arranged into a matrix. In an example, the fragments may be represented entries such as ES'_1 . . . ES'_N, ER1_1 . . . ER1_N, . . . ERk_1 . . . ERk_N. In this example, at least k of the fragments are non-ECC.

Further, the encrypted key ECC computing engine (214-2) concatenates the encrypted key ECC to the encrypted key as illustrated in Equation 2. The encrypted key ECC computing engine (214-2) calculates a random value ECC for each of the random values, the random value ECC enabling the random values to be reconstructed from the threshold number of the storage servers. Further, the encrypted key ECC computing engine (214-2) concatenates the random value ECC to each random value. Further, the encrypted key ECC computing engine (214-2) splits the encrypted key, the encrypted key ECC, the number of random values, and the random value ECC into the number of key fragments. As a result, the encrypted key ECC computing engine (214-2) creates a matrix based on the number of fragments. In keeping with the given example, the number of fragments, represented as entries, are illustrated in Matrix

| ES'_1 | | ES'_N | (Matrix 1) |
|-------|---|-------|------------|
| ER1_1 | . . . | ER1_N | |
| . . . | | . . . | |
| ERk_1 | | ERk_N | |

In an example, each of the entries may be 15 bits. In this example, the size of the matrix depends on a number of factors. In an example, the factors include the size of the size of the encrypted key, the random values, the encrypted key ECC, the random value ECC, other factors, or combinations thereof.

The key fragment storing engine (214-3) stores a number of key fragments on a number of storage servers (212). In an example, the number of key fragments includes the encrypted key, the random values, the encrypted key ECC for the encrypted key and the random values. In an example, the key fragment storing engine (214-3) stores one of the number of fragments from each row of a matrix on one of the number of storage servers (212). For example, a number of fragments (216) may be stored on a number of storage servers (212). As illustrated, fragment one (216-1) may be S'_1+R1_2+R2_3+R3_4, from Matrix 1. In this example, fragment one (216-1) is stored on storage server one (212-1). Fragment two (216-2) may be S'_2+R1_3+R2_4+R3_1, from Matrix 1. In this example, fragment two (216-2) is stored on storage server two (212-2). Fragment three (216-3) may be S'3+R1_4+R1_3+R3_2, from Matrix 1. In this example, fragment three (216-3) is stored on storage server three (212-3). Fragment four (216-4) may be S'_4+R1_1+R2_2+R3_3, from Matrix 1. In this example, fragment four (216-4) is stored on storage server four (212-4). In an example, the total size of all of the key fragments (216) may be expressed as Equation 3:

$$\text{Size of all key fragments}=((k+1)*(N/k)*\text{the size of the key}) \quad \text{(Equation 3)}$$

In this example, k is the number of random values and N is the total number of storage servers storing the number of fragments. For large k, the size of all the key fragments trends towards N times the size of the key, which is the same as if Shamir Secret Sharing was used. For example, with N=10, k=6, Size of all key fragments=11.7. Further, when treating the object as the secret, the size of all the objects data, stored with ECC, is N/k times the size of the object. For example, with N=10, k=6, the object can be stored (10/(10/6))=6 times more efficiently than using other methods, such as secret sharing, on the object directly. As will be described below, the fragments (216) may include key fragments and object fragments.

The encrypted object computing engine (214-4) computes an encrypted object with the key. In an example, the key may be randomly chosen. In one example, the key is randomly chosen using a random number generator (218). In an example, the encrypted object computing engine (214-4) receives an object. As mentioned above, an object may be data that is stored in a storage architecture that manages objects. In an example, the object may include data, metadata, and a globally unique identifier. In an example, the object may be received via the user device (202) if the object is stored in the user device (202). For example, the user may access the utilizing system (210) via a network (206). In an example, the user may upload the object to the utilizing system (210) via common methods and techniques for uploading.

The encrypted object computing engine (214-4) encrypts the object with the key, the key randomly chosen using a high entropy random number generator to create the encrypted object. In an example, the random number generator (218) may be a high entropy random number generator. Further, the encrypted object computing engine (214-4) may use common methods and techniques to create the encrypted object. For example, an encryption algorithm may be based on an advanced encryption standard (AES). In an example, AES may be a standard for encryption of the object that is widely practiced. Further, the encryption algorithm may be based on the AES using XTS mode. In an example, XTS mode may be a form of ciphertext stealing that provides support for sectors with size not divisible by a block size. For example, 520 byte sectors and 16 byte blocks. Since, the encrypted object computing engine (214-4) encrypts the object with a key using common methods and techniques, the encrypted object may be defined as follows in Function 1:

$$O'=ENC\_AES\_XTS(O, \text{null}, S) \quad \text{(Function 1)}$$

In this example, O' is the encrypted object, O is the object, and S is the key. In this example, the object and the key are passed into the function ENC_AES_XTS. In this is example, Function 1 encrypts the object via AES in XTS mode using the key to create the encrypted object. Further, the encrypted object ECC computing engine (214-5) calculates, based on the second ECC scheme, the object ECC for the encrypted object with the key, the object ECC enabling the encrypted object to be reconstructed from a threshold number of the storage servers. In an example, the object ECC is calculated such that the encrypted object can be reconstructed, based on the second ECC scheme, from the threshold number of storage servers. For example, an encrypted object may be stored, as four object fragments, on four storage servers. In this example, the object ECC is calculated, based on the second ECC scheme, such that three fragments are needed to recover the encrypted object. In an example, encrypted object ECC computing engine (214-5) may use common methods and techniques, available, for example, in a key value store (KVS). In an example, KVS stores the object's hash in metadata and uses it for various table key values. In an example, if the object is an encrypted object, the hash of the encrypted object may be used instead.

The object fragment storing engine (214-6) stores a number of object fragments on the number of storage servers (212). In an example, the number of object fragments includes the encrypted object and the object ECC. For example, storage server one (212-1) may store one of the object fragments as fragment one (216-1). Further, storage server two (212-2) may store another on one of the object fragments as fragment two (216-2).

As a result, each storage server holds a number of fragments such as object fragments and key fragments. In an example, the number of key fragments may be ECC fragments or non-ECC fragments, from the encrypted key and each random value. However, none of the non-ECC key fragments, on any storage server have overlapping bit ranges. Further, key fragments from at least k storage servers, where k is the number of random values, must be retrieved before any overlapping bit range for the encryption key and the random numbers can be reconstructed via ECC. The ECC fragments are derived from all bit ranges, but the mathematical properties of the ECC schemes are such that no information about how to decrypt the encrypted key can be determined from the ECC unless key fragments are returned from at least k of N storage servers, where k is the number of random values and N is the total number of storage servers storing the number of fragments. As a result, retrieving the number of key fragments from any k storage servers enables the utilizing system (210) to recover the encrypted key and random values, but retrieving fragments from k−1 or fewer storage servers does not provide the key and all random value fragments for any bit range, thus keeping all bits of the key completely secure.

In this example, the key fragments may be based on Matrix 1 where one fragment from each row in Matrix 1 is selected, but the column from each fragment chosen for a storage server is different. In an example, a deterministic scheme may be used to choose fragments from Matrix 1 along the matrix diagonal.

As mentioned above, the utilizing system (210) includes the reconstructing engine (214-7). The reconstructing engine (214-7) reconstructs the encrypted object, the encrypted key, and the random values from a threshold number of the storage servers (212).

In an example, the reconstructing engine (214-7) reconstructs the encrypted object from a number of object fragments from the threshold number of the storage servers (212). For example, if the threshold number of storage servers is three, the reconstructing engine (214-7) reconstructs the encrypted object from a number of object fragments from three storage servers. In an example, the reconstructing engine (214-7) may apply an object ECC to recover the encrypted object in KVS.

Further, the reconstructing engine (214-7) reconstructs the encrypted key from the number of key fragments from the threshold number of the storage servers (212). For example, if the threshold number of storage servers is three, the reconstructing engine (214-7) reconstructs the encrypted key from a number of key fragments from three storage servers. The reconstructing engine (214-7) further reconstructs the random values from the key fragments from the threshold number of the storage servers. For example, if the threshold number of storage servers is three, the reconstructing engine (214-7) reconstructs the random values from a number of key fragments from three storage servers. In an example, the reconstructing engine (214-7) may apply the encrypted key ECC to recover the encrypted key and random values in KVS. In an example, to decrypt any bit associated the encrypted key, the reconstructing engine (214-7) needs to have a bit from the encrypted key and the same bit from each random value the key was xor'd against.

Further, the reconstructing engine (214-7) decrypts, based on the encrypted key and the random values, the encrypted key to obtain the key. For example, the key may be decrypted has shown in Equation 4:

$$S = S' \text{ xor } R1 \ldots \text{ xor } Rk \quad \text{(Equation 4)}$$

As a result, the encrypted key may be decrypted via Equation 4 to obtain the key.

The reconstructing engine (214-7) further decrypts the encrypted object using the key to obtain an object. For example, the reconstructing engine (214-7) decrypts the encrypted object using the key to obtain the object using common methods and techniques, the object may be defined as follows in Function 2:

$$O = DEC\_AES\_XTS(O', \text{null}, S) \quad \text{(Function 2)}$$

In this example, O' is the encrypted object, O is the object, and S is the key. In this example, the object and the key are passed into the function DEC_AES_XTS. In this example, Function 2 decrypts the encrypted object via AES in XTS mode.

An overall example, of the system (200) will now be described. In an example, an object may be stored on a user device (202). In this example, the object may be associated with a length. Further, the user may desire to encrypt the object. In an example, the user sends, via the user device (202), the object to a utilizing system (210).

In this example, the utilizing system (210) uses the encrypted key computing engine (214-1) to compute an encrypted key using a key and a number of random values. In this example, the key may be 5 bits. As a result, the random values are also 5 bits. In this example, the random number generator (218) may be used to select the key and the random numbers.

The utilizing system (210) uses the encrypted key ECC computing engine (214-2) to compute, based on a first ECC scheme, an encrypted key ECC for the encrypted key and the random values. For example, the user desires the encrypted key to be reconstructed via two storage servers. As a result, the encrypted key ECC is calculated, based on a first ECC scheme, such that the encrypted key may be reconstructed via two storage servers. As mentioned above, the encrypted key computing engine (214-1) computes, based on the random values and the key, an XOR cipher to create the encrypted key. The encrypted key ECC computing engine (214-2) calculates the encrypted key ECC for the encrypted key, concatenates the encrypted key ECC to the encrypted key, and splits the encrypted key ECC associated with the encrypted key and the number of random values into the number of key fragments. In this example, the number of key fragments may be three. In an example, the encrypted key ECC computing engine (214-2) creates a matrix based on the number of key fragments. For example, the matrix may be:

$ES'\_1, ES'\_2, ES'\_3$ $ER1\_1, ER1\_2, ER1\_3$ $ER2\_1, ER2\_2, ER2\_3$

Further, the utilizing system (210) uses the key fragment storing engine (214-3) to store a number of key fragments on a number of storage servers, the number of key fragments includes the encrypted key, the random values, and the encrypted key ECC. In an example, the key fragment storing engine (214-3) stores one of the number of fragments from each row of the matrix on one of the number of storage servers (212) such that two storage servers (212) are needed for the decrypting engine (214-4) to decrypt the object as described above. For example, storage server one (212-1) stores ES'_1||ER1_2||ER2_3, storage server two (212-2) stores ES'_2||ER1_3||ER2_1 and storage server three (212-3) stores ES'_3||ER1_1||ER2_2. In an example, || is a concatenation operation.

The utilizing system (210) uses the encrypted object computing engine (214-4) to compute an encrypted object with the key. Further, the utilizing system (210) uses the encrypted object ECC computing engine (214-5) to compute, based on a second ECC scheme, an object ECC for the encrypted object. The utilizing system (210) uses the object fragment storing engine (214-6) to store a number of object fragments on the number of storage servers (212), the number of object fragments includes the encrypted object and the object ECC. In an example, the second ECC scheme may be similar to the first ECC scheme. In this example, the object fragments and the key fragments may be stored as the fragments (216) illustrated in FIG. 2.

Further, the utilizing system (210) uses the reconstructing engine (214-7) to reconstruct the encrypted object, the encrypted key, and the random values from a threshold number of the storage servers (212). In this example, the threshold number of the storage servers (212) is two. In an example, reconstructing engine (214-7) may use the methods and techniques above to reconstruct the encrypted object, the encrypted key, and the random values from a threshold number of the storage servers (212). As a result, the encrypted object may be reconstructed via two of the storage servers (212).

Figure 3:
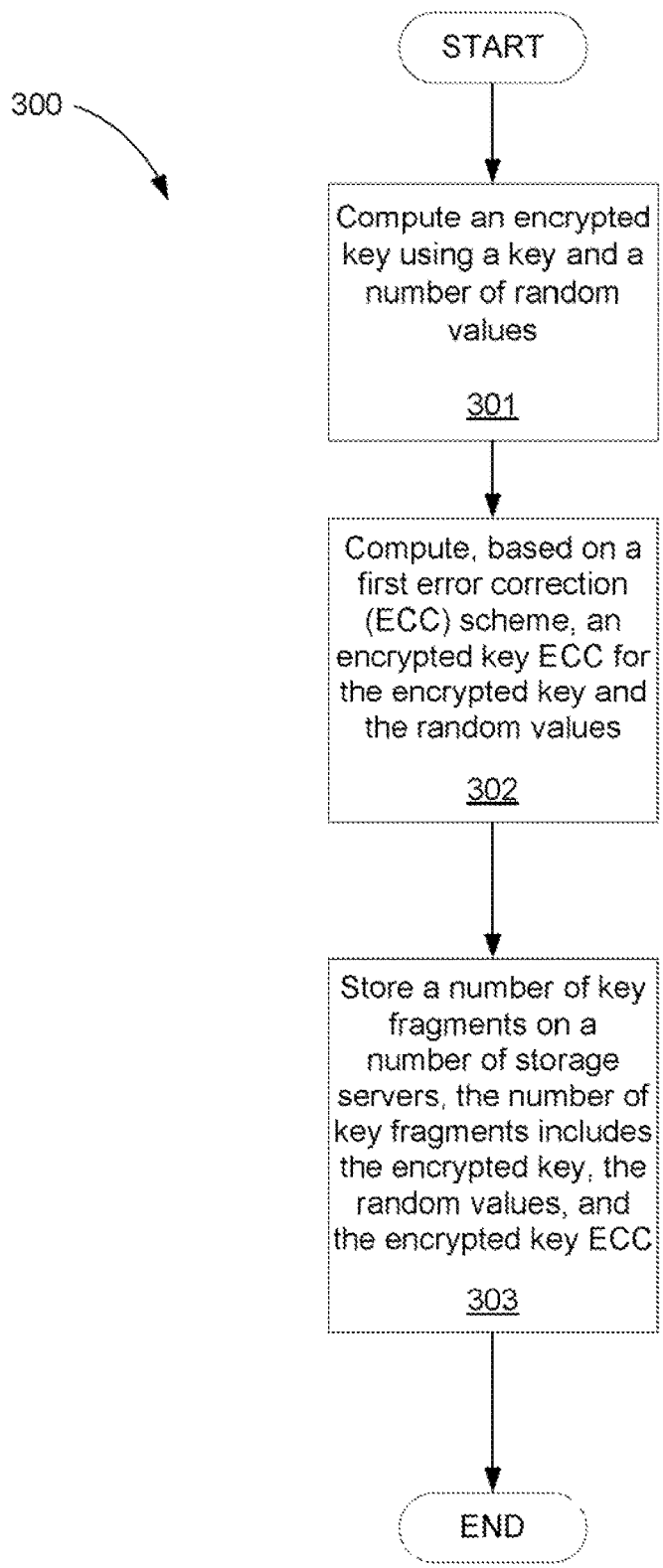
FIG. 3 is a flowchart of an example of a method for utilizing ECC for secure secret sharing, according to one example of principles described herein.

FIG. 3 is a flowchart of an example of a method for utilizing ECC for secure secret sharing, according to one example of principles described herein. In one example, the method (300) may be executed by the system (100) of FIG. 1. In other examples, the method (300) may be executed by other systems such as system 200, system 500 or system 600. In this example, the method (300) includes computing (301) an encrypted key using a key and a number of random values, computing (302), based on a first ECC scheme, an encrypted key ECC for the encrypted key and the random values, and storing (303) a number of key fragments on a number of storage servers, the number of key fragments includes the encrypted key, the random values, and the encrypted key ECC.

As mentioned above, the method (300) includes computing (301) an encrypted key using a key and a number of random values. In one example, the encrypted key computing engine of FIG. 2 computes an encrypted key using a key and a number of random values. In an example, the length of the key and the length of the random values are the same length. For example, if the length of a key is eight bits, the number of random values is all eight bits. Further, the number of random values is equal to the threshold of the number of storage servers that need to reconstruct an encrypted key and/or encrypted object. For example, if the encrypted key may be reconstructed by access key fragments associated from two storage servers, two random values are needed. In another example, if the encrypted key may be reconstructed by access key fragments associated from seven storage servers, seven random values are needed. In this example, the threshold of the number of storage servers may be determined by a first ECC scheme.

Further, computing (301), the encrypted key and the random values includes computing, based on the random values and the key, an XOR cipher to create the encrypted key. As mentioned above, the encrypted key may be defined by Equation 1.

As mentioned above, the method (300) includes computing (302), based on a first ECC scheme, an encrypted key ECC for the encrypted key and the random values. In an example, the encrypted key ECC computing engine of FIG. 2 computes, based on a first ECC scheme, an encrypted key ECC for the encrypted key and the random values.

In an example, computing (302), based on a first ECC scheme, an encrypted key ECC for the encrypted key and the random values includes selecting the number of random values using a high entropy random number generator. As mentioned above, the number of random values are the same length as the key.

In an example, computing (302), based on a first ECC scheme, an encrypted key ECC for the encrypted key and the random values includes calculating the encrypted key ECC for the encrypted key. In an example, the encrypted key ECC enables the encrypted key to be reconstructed from a threshold number of the storage servers. For example, if the threshold number of storage servers is three storage servers, the encrypted key ECC enables the encrypted key to be reconstructed from three or more storage servers, Further, computing (302), based on a first ECC scheme, an encrypted key ECC for the encrypted key and the random values includes concatenating the encrypted key ECC to the encrypted key. In an example, the encrypted key ECC is concatenated to the encrypted key as represented in Equation 2 above. Further, computing (302), based on a first ECC scheme, an encrypted key ECC for the encrypted key and the random values includes calculating a random value ECC for each of the random values. In an example, the random value ECC enables the random values to be reconstructed from the threshold number of the storage servers. In an example, the method (300) repeats this step for each random value. This creates a number of key fragments that are to be arranged into, for example, a matrix. In an example, the key fragments may be represented as entries. As mentioned above, the method (300) creates a matrix based on the number of key fragments. In this example, the size of the matrix depends on a number of factors. In an example, the factors include the size of the size of the encrypted key, the random values, the encrypted key ECC, the random value ECC, other factors, or combinations thereof.

In an example, computing (302), based on the first ECC scheme, the encrypted key ECC for the encrypted key and the random values includes splitting the encrypted key, the encrypted key ECC, the number of random values, and the random value ECC into the number of key fragments. As mentioned above, the key fragments are distributed and stored on a number of storage servers.

Further, the method (300) includes storing (303) the number of key fragments on a number of storage servers. In an example, the number of key fragments includes the encrypted key, the random values, and the encrypted key ECC. As a result, the encrypted key may not be reconstructed unless the threshold or more of the storage servers are accessed.

Figure 4:
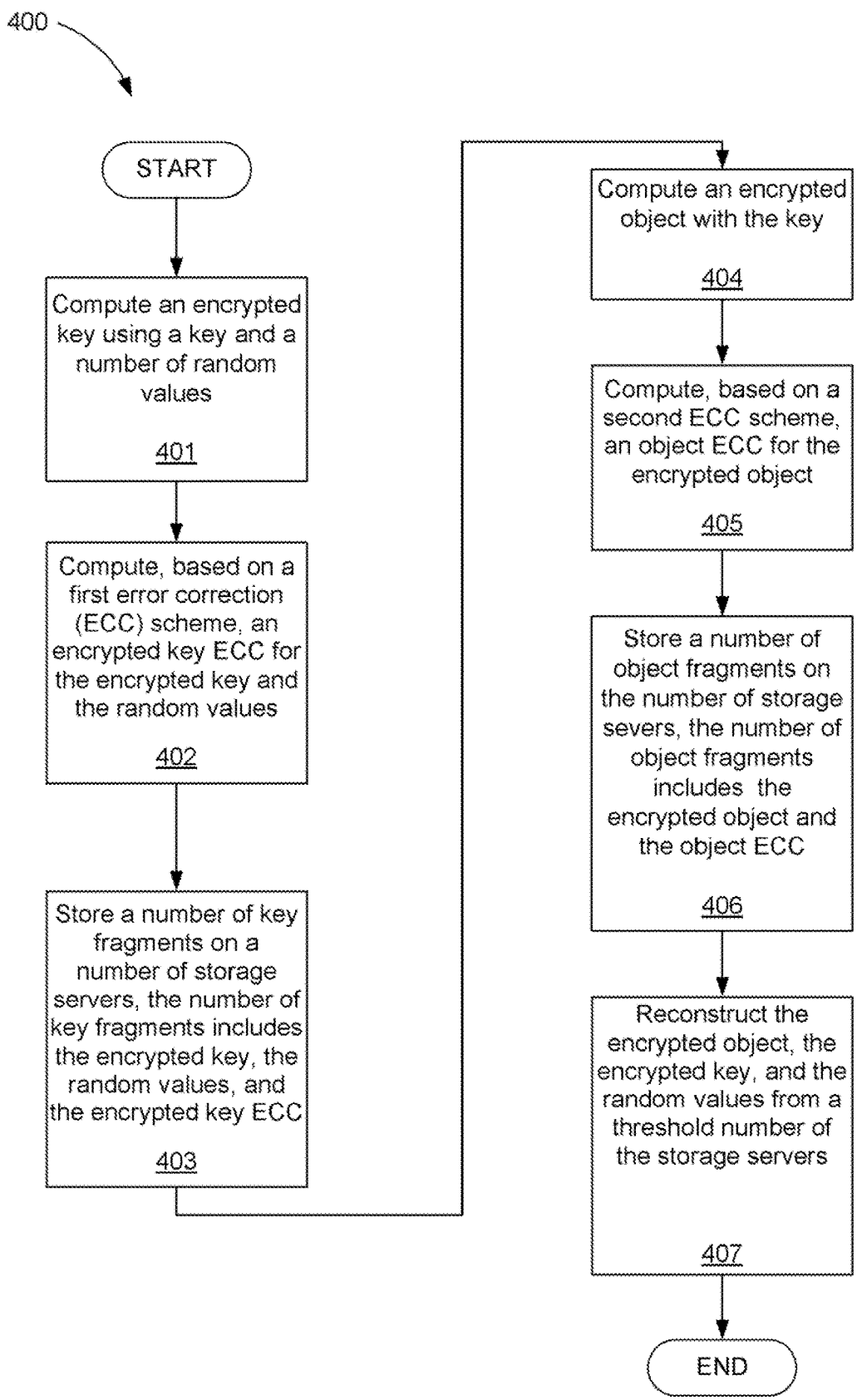
FIG. 4 is a flowchart of an example of a method for utilizing ECC for secure secret sharing, according to one example of principles described herein.

FIG. 4 is a flowchart of an example of a method for utilizing ECC for secure secret sharing, according to one example of principles described herein. In one example, the method (400) may be executed by the system (100) of FIG. 1. In other examples, the method (400) may be executed by other systems such as system 200, system 500 or system 600. In this example, the method (400) includes computing (401) an encrypted key using a key and a number of random values, computing (402), based on a first ECC scheme, an encrypted key ECC for the encrypted key and the random values, storing (403) a number of key fragments on a number of storage servers, the number of key fragments comprising the encrypted key, the random values, and the encrypted key ECC, computing (404) an encrypted object with the key, computing (405), based on a second ECC scheme, an object ECC for the encrypted object, storing (406) a number of object fragments on the number of storage servers, and reconstructing (407) the encrypted object, the encrypted key, and the random values from a threshold number of the storage servers.

As mentioned above, the method (400) includes computing (404) an encrypted object with the key. In an example, the encrypted object computing engine of FIG. 2 computes an encrypted object with the key. As mentioned above, the key may be randomly chosen. In an example, the key may be associated with a length. In one example, the length of the key may be 128 bits, 192 bits, 156 bits, or other lengths to maximize encryption purposes. In an example, to provide maximum security, the method (400) uses a different key for each object and stores the key with the object so it can be reconstructed when retrieved. As mentioned above, the key is stored in such a way that the method (400) can be recovered by accessing a threshold number of storage servers.

Further, computing (404) an encrypted object with a key includes receiving an object. In an example, an object may be received from a location such as a user device, a database, a server, other locations, or combinations thereof. In an example, the location represents where the object is currently stored. As mentioned above, an object may be stored in a storage architecture that manages objects. Further, the object may include data, metadata, and a globally unique identifier.

Further, computing an encrypted object with the key includes encrypting the object with the key. As mentioned above, the key is randomly chosen using a high entropy random number generator to create the encrypted object.

As mentioned above, the method (400) includes computing (405), based on a second ECC scheme, an object ECC for the encrypted object. In an example, the encrypted object ECC computing engine of FIG. 2 computes, based on a second ECC scheme, an object ECC for the encrypted object.

In an example, the object ECC enables the encrypted object to be reconstructed from a threshold number of the storage servers. For example, if there are five storage servers, the object ECC is calculated, based on the second ECC scheme, such that the encrypted object may be reconstructed by accessing object fragments associated with the encrypted object from five or less storage servers, but more than two storage servers. For example, the encrypted object may be reconstructed by access object fragments associated from two storage servers. In an example, the fewer the number of storage servers needed to reconstruct the encrypted object, the greater the number of bits for the object ECC and/or the encrypted key ECC is needed. For example, if the number of bits for the object ECC and/or the encrypted key ECC may be ten if the encrypted object may be reconstructed by access object fragments associated from three storage servers. The number of bits for the object ECC and/or the encrypted key ECC may be twenty if the encrypted object may be reconstructed by access object fragments associated from two storage servers. In an example, the second ECC scheme may be the same as the first ECC scheme in the fact that the same number of threshold storage servers are needed for reconstructing purposes.

As mentioned above, the method (400) includes storing (406) a number of object fragments on the number of storage servers. In an example, the number of object fragments includes the encrypted object and the object ECC. As mentioned above, the object fragments are stored on the number of storage servers such that a threshold number of storage servers are needed to reconstruct the encrypted object from the object fragments.

As mentioned above, the method (400) includes reconstructing (407) the encrypted object, the encrypted key, and the random values from a threshold number of the storage servers. In an example, the reconstructing engine of FIG. 2 reconstructs the encrypted object from a number of object fragments from the threshold number of the storage servers.

Further, reconstructing (407) the encrypted object, the encrypted key, and the random values from a threshold number of the storage servers includes reconstructing the encrypted key from the number of key fragments from the threshold number of the storage servers. As mentioned above, the threshold number of the storage servers may be based on the first ECC scheme and/or second ECC scheme.

Further, reconstructing (407) the encrypted object, the encrypted key, and the random values from a threshold number of the storage servers includes reconstructing the random values from the key fragments from the threshold number of the storage servers, decrypting based on the encrypted key and the random values, the encrypted key to obtain the key, and decrypting the encrypted object using the key to obtain an object.

Figure 5:
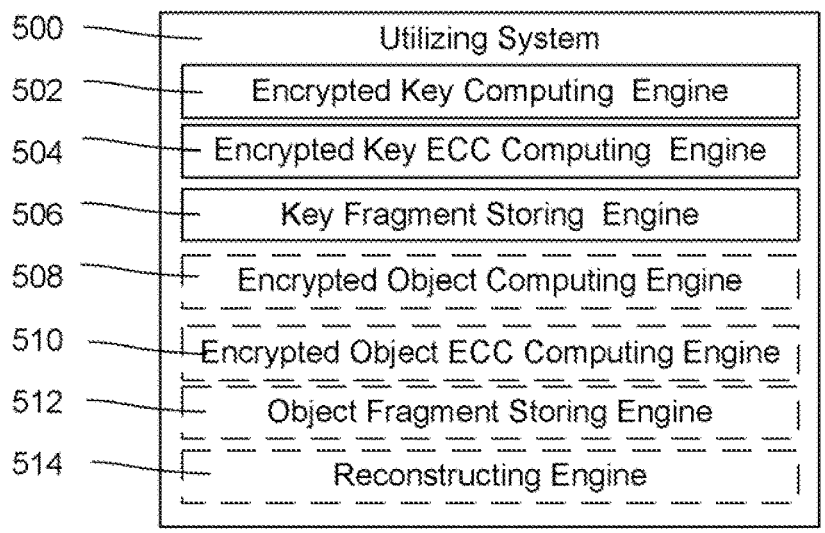
FIG. 5 is a diagram of an example of a utilizing system, according to one example of principles described herein.

FIG. 5 is a diagram of an example of a utilizing system, according to one example of principles described herein. The utilizing system (500) includes an encrypted key computing engine (502), an encrypted key ECC computing engine (504), and a key fragment storing engine (506). In this example, the utilizing system (500) also includes an encrypted object computing engine (508), an encrypted object ECC computing engine (510), an object fragment storing engine (512), and a reconstructing engine (514). The engines (502, 504, 506, 508, 510, 512, 514) refer to a combination of hardware and program instructions to perform a designated function. Each of the engines (502, 504, 506, 508, 510, 512, 514) may include a processor and memory. The program instructions are stored in the memory and cause the processor to execute the designated function of the engine.

The encrypted key computing engine (502) computes an encrypted key using a key and a number of random values. In an example, the length of the key and the length of the random values are the same length. In an example, the encrypted key computing engine (502) selects the number of random values using a high entropy random number generator, the number of random values being the same length as the key. Further, the encrypted key computing engine (502) computes, based on the random values and the key, an XOR cipher to create the encrypted key.

The encrypted key ECC computing engine (504) computes, based on a first ECC scheme, an encrypted key ECC for the encrypted key and the random values. In an example, the encrypted key ECC computing engine (504) calculates the encrypted key ECC for the encrypted key, the encrypted key ECC enabling the encrypted key to be reconstructed from a threshold number of the storage servers. Further, the encrypted key ECC computing engine (504) concatenates the encrypted key ECC to the encrypted key. The encrypted key ECC computing engine (504) calculates a random value ECC for each of the random values, the random value ECC enabling the random values to be reconstructed from the threshold number of the storage servers. Further, the encrypted key ECC computing engine (504) splits the encrypted key, the encrypted key ECC, the number of random values, and the random value ECC into the number of key fragments.

The key fragment storing engine (506) stores a number of key fragments on a number of storage servers. In an example, the number of key fragments includes the encrypted key, the random values, and the encrypted key ECC.

The encrypted object computing engine (508) computes an encrypted object with the key. In an example, the key may be randomly chosen. In an example, the encrypted object computing engine (508) receives an object. The encrypted object computing engine (508) encrypts the object with the key, the key randomly chosen using a high entropy random number generator to create the encrypted object.

The encrypted object ECC computing engine (510) computes, based on a second ECC scheme, an object ECC for the encrypted object. In an example, the encrypted object ECC computing engine (510) calculates, based on the second ECC scheme, the object ECC for the encrypted object with the key, the object ECC enabling the encrypted object to be reconstructed from a threshold number of the storage servers The object fragment storing engine (512) stores a number of object fragments on the number of storage servers. In an example, the number of object fragments includes the encrypted object and the object ECC.

The reconstructing engine (514) reconstructs the encrypted object, the encrypted key, and the random values from a threshold number of the storage servers. In an example, the reconstructing engine (514) reconstructs the encrypted object from a number of object fragments from the threshold number of the storage servers. Further, the reconstructing engine (514) reconstructs the encrypted key from the number of key fragments from the threshold number of the storage servers. The reconstructing engine (514) further reconstructs the random values from the key fragments from the threshold number of the storage servers. Further, the reconstructing engine (514) decrypts, based on the encrypted key and the random values, the encrypted key to obtain the key. The reconstructing engine (514) further decrypts the encrypted object using the key to obtain an object.

Figure 6:
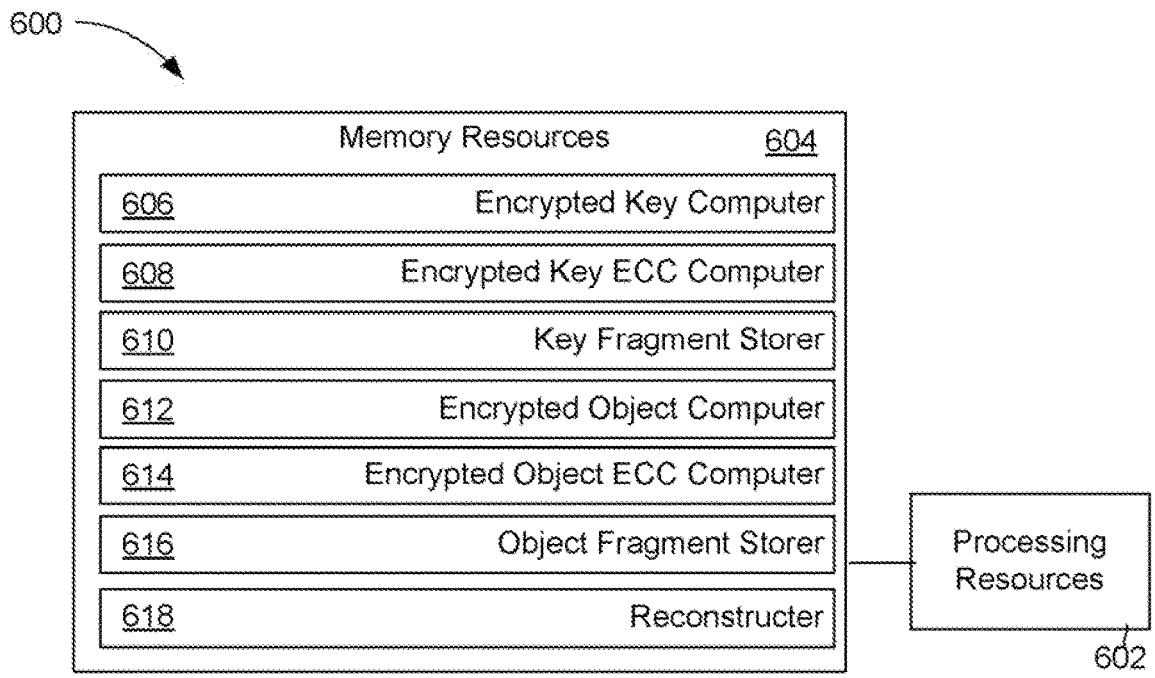
FIG. 6 is a diagram of an example of a utilizing system, according to one example of principles described herein.

FIG. 6 is a diagram of an example of a utilizing system, according to one example of principles described herein. In this example, utilizing system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the utilizing system (600). The programmed instructions shown stored in the memory resources (604) include an encrypted key computer (606), an encrypted key ECC computer (606), a key fragment storer (610), an encrypted object computer (612), an encrypted object ECC computer (614), an object fragment storer (616), and a reconstructer (618).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The encrypted key computer represents programmed instructions that, when executed, cause the processing resources (602) to compute an encrypted key using a key and a number of random values. The encrypted key ECC computer (608) represents programmed instructions that, when executed, cause the processing resources (602) to compute, based on a first ECC scheme, an encrypted key ECC for the encrypted key and the random values.

The key fragment storer (610) represents programmed instructions that, when executed, cause the processing resources (602) to store a number of key fragments on a number of storage servers, the number of key fragments includes the encrypted key, the random values, and the encrypted key ECC. The encrypted object computer (612) represents programmed instructions that, when executed, cause the processing resources (602) to compute an encrypted object with the key.

The encrypted object ECC computer (614) represents programmed instructions that, when executed, cause the processing resources (602) to compute, based on a second ECC scheme, an object ECC for the encrypted object. The object fragment storing (616) represents programmed instructions that, when executed, cause the processing resources (602) to store a number of object fragments on the number of storage servers, the number of object fragments comprising the encrypted object and the object ECC. The reconstructer (618) represents programmed instructions that, when executed, cause the processing resources (602) to reconstruct the encrypted object, the encrypted key, and the random values from a threshold number of the storage servers.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (602) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the utilizing system (600) may be implemented on a user device, on a server, on a collection of servers, or combinations thereof.

The utilizing system (600) of FIG. 6 may be part of a general purpose computer. However, in alternative examples, the utilizing system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
computing an encrypted key from a key and from a plurality of random values;
calculating encrypted key reconstruction data for the encrypted key and random value reconstruction data for the random values;
splitting the encrypted key, the encrypted key reconstruction data, the plurality of random values, and the random value reconstruction data into a plurality of key fragments;
storing the plurality of key fragments on a plurality of storage servers, the encrypted key reconstruction data enabling the encrypted key to be reconstructed from a threshold number of the storage servers, and the random value reconstruction data enabling the random values to be reconstructed from the threshold number of the storage servers; and
reconstructing an encrypted object, the encrypted key, and the random values from the threshold number of the storage servers.

2. The method of claim 1, further comprising:
computing an encrypted object with the key;
calculating object reconstruction data for the encrypted object; and
storing a plurality of object fragments on the number of storage servers, the plurality of object fragments comprising the encrypted object and the object reconstruction data.

3. The method of claim 2, comprising:
receiving an object;
wherein computing the encrypted object comprises encrypting the object with the key, the key randomly chosen using a high entropy random number generator; and
the object reconstruction data enabling the encrypted object to be reconstructed from the threshold number of the storage servers.

4. The method of claim 1, comprising:
selecting the number of random values using a high entropy random number generator, the number of random values being the same length as the key;
computing, based on the random values and the key, an exclusive or (XOR) cipher to create the encrypted key; and
concatenating the encrypted key reconstruction data to the encrypted key.

5. The method of claim 1 in which reconstructing the encrypted object, the encrypted key, and the random values from the threshold number of the storage servers comprises:
reconstructing the encrypted object from a number of object fragments from the threshold number of the storage servers;
reconstructing the encrypted key from a number of the key fragments from the threshold number of the storage servers;
reconstructing the random values from a number of the key fragments from the threshold number of the storage servers;
decrypting, based on the encrypted key and the random values, the encrypted key to obtain the key; and
decrypting the encrypted object using the key to obtain an object.

6. A system comprising:
a processor; and
a non-transitory computer readable storage medium comprising instructions executable by the processor to:
compute an encrypted key from a key and from a number of random values;
calculate encrypted key reconstruction data for the encrypted key and random value reconstruction data for the random values;
split the encrypted key, the encrypted key reconstruction data, the number of random values, and the random value reconstruction data into a plurality of key fragments;
store the plurality of key fragments on a plurality of storage servers, the encrypted key reconstruction data enabling the encrypted key to be reconstructed from a threshold number of the storage servers, and the random value reconstruction data enabling the random values to be reconstructed from the threshold number of the storage servers; and reconstruct an encrypted object, the encrypted key, and the random values from the threshold number of the storage servers.

7. The system of claim 6, wherein the instructions are executable by the processor to:

compute an encrypted object with the key;

calculate object reconstruction data for the encrypted object;

store a plurality of object fragments on the number of storage servers, the plurality of object fragments comprising the encrypted object and the object reconstruction data; and reconstruct the encrypted object, the encrypted key, and the random values from the threshold number of the storage servers.

8. The system of claim 7, wherein the instructions are executable by the processor to:

receive an object;

encrypt the object with the key to compute the encrypted object, the key randomly chosen using a high entropy random number generator; and the object reconstruction data enabling the encrypted object to be reconstructed from the threshold number of the storage servers.

9. The system of claim 6, wherein the instructions are executable by the processor to:

select the number of random values using a high entropy random number generator, the number of random values being the same length as the key;

compute, based on the random values and the key, an exclusive or (XOR) cipher to create the encrypted key; and concatenate the encrypted key reconstruction data to the encrypted key.

10. The system of claim 6, wherein the instructions are executable by the processor to:

reconstruct an encrypted object from a number of object fragments from the threshold number of the storage servers;

reconstruct the encrypted key from a number of key fragments from the threshold number of the storage servers;

reconstruct the random values from a number of the key fragments from the threshold number of the storage servers;

decrypt, based on the encrypted key and the random values, the encrypted key to obtain the key; and decrypt the encrypted object using the key to obtain an object.

11. A non-transitory computer readable storage medium comprising instructions executable by a processor to:

compute an encrypted key from a key and from a number of random values;

calculate encrypted key reconstruction data for the encrypted key and random value reconstruction data for the random values;

split the encrypted key, the encrypted key reconstruction data, the number of random values, and the random value reconstruction data into a plurality of key fragments;

store the plurality of key fragments on a plurality of storage servers, the encrypted key reconstruction data enabling the encrypted key to be reconstructed from a threshold number of the storage servers, and the random value reconstruction data enabling the random values to be reconstructed from the threshold number of the storage servers; and reconstruct an encrypted object, the encrypted key, and the random values from the threshold number of the storage servers.

12. The non-transitory computer readable storage medium of claim 11, wherein the instructions are executable by the processor to:

compute an encrypted object with the key;

calculate object reconstruction data for the encrypted object; and store a plurality of object fragments on the number of storage servers, the plurality of object fragments comprising the encrypted object and the object reconstruction data.

13. The non-transitory computer readable storage medium of claim 12, wherein the instructions are executable by the processor to reconstruct the encrypted object, the encrypted key, and the random values from the threshold number of the storage servers.

14. The non-transitory computer readable storage medium of claim 12, wherein the instructions are executable by the processor to:

receive an object;

encrypt the object with the key to compute the encrypted object, the key randomly chosen using a high entropy random number generator; and the object reconstruction data enabling the encrypted object to be reconstructed from the threshold number of the storage servers.

15. The non-transitory computer readable storage medium of claim 11, wherein the instructions are executable by the processor to:

select the number of random values using a high entropy random number generator, the number of random values being the same length as the key;

compute, based on the random values and the key, an exclusive or (XOR) cipher to create the encrypted key;

concatenate the encrypted key reconstruction data to the encrypted key.

16. The non-transitory computer readable storage medium of claim 13, wherein the instructions are executable by the processor to:

reconstruct the encrypted object from a number of object fragments from the threshold number of the storage servers;

reconstruct the encrypted key from a number of key fragments from the threshold number of the storage servers;

reconstruct the random values from a number of the key fragments from the threshold number of the storage servers;

decrypt, based on the encrypted key and the random values, the encrypted key to obtain the key; and decrypt the encrypted object using the key to obtain an object.

* * * * *